(12) United States Patent
Asenath-Smith et al.

(10) Patent No.: US 11,298,689 B2
(45) Date of Patent: Apr. 12, 2022

(54) MULTI-SPECTRAL PHOTOCATALYTIC COMPOUNDS

(71) Applicant: United States of America as Represented by The Secretary of The Army, Alexandria, VA (US)

(72) Inventors: Emily Asenath-Smith, Hanover, NH (US); Emma K Ambrogi, Hanover, NH (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 551 days.

(21) Appl. No.: 16/105,117

(22) Filed: Aug. 20, 2018

(65) Prior Publication Data
US 2020/0055031 A1 Feb. 20, 2020

(51) Int. Cl.
| | | |
|---|---|---|
| *B01J 23/80* | (2006.01) | |
| *B01J 23/745* | (2006.01) | |
| *B01J 35/00* | (2006.01) | |
| *B01J 35/02* | (2006.01) | |
| *B01D 53/86* | (2006.01) | |
| *C02F 1/72* | (2006.01) | |

(Continued)

(52) U.S. Cl.
CPC .............. *B01J 23/80* (2013.01); *B01D 53/86* (2013.01); *B01J 23/745* (2013.01); *B01J 35/004* (2013.01); *B01J 35/026* (2013.01); *C02F 1/30* (2013.01); *C02F 1/32* (2013.01); *C02F 1/725* (2013.01); *B01D 2255/20738* (2013.01); *B01D 2255/20761* (2013.01); *B01D 2255/20792* (2013.01); *B01D 2255/802* (2013.01); *C02F 2305/10* (2013.01)

(58) Field of Classification Search
CPC . B01J 23/80; B01J 23/745; B01J 35/00; B01J 35/02; B01J 53/86; C02F 1/72; C02F 1/32; C02F 1/30
See application file for complete search history.

(56) References Cited

U.S. PATENT DOCUMENTS

2013/0153515 A1* 6/2013 Kang .................... C02F 1/32
210/748.14

FOREIGN PATENT DOCUMENTS

WO WO-03035227 A1 * 5/2003 ......... B01D 53/9454

* cited by examiner

*Primary Examiner* — Walter D. Griffin
*Assistant Examiner* — Cameron J Allen
(74) *Attorney, Agent, or Firm* — Brian C. Jones

(57) ABSTRACT

Disclosed are various combinations of three different metal-oxide photocatalysts with three different bandgaps that can be used to harvest multiple wavelengths of incident solar radiation and to thus efficiently degrade recalcitrant contaminants. The photocatalysts are from the class of transition metal oxides and are non-toxic compounds based on earth-abundant materials. In some embodiments, particles of the photocatalysts are formed to be greater in diameter than about 0.1 μm in order to make them easier to filter out after treating the contaminant. In some embodiments, the metal-oxide photocatalysts are zinc oxide which is ultraviolet active, hematite which is active in the visible spectrum, and copper oxide which is active in the near infrared spectrum. Various combinations in various embodiments achieve measured contaminant degradation rates greater than the sum of the degradation rates of the individual photocatalysts that make up the combination.

5 Claims, 16 Drawing Sheets

(51) Int. Cl.
*C02F 1/30* (2006.01)
*C02F 1/32* (2006.01)

| Compound Name | Formula | Bandgap (eV) | Wavelength (nm) | Surface area[a] (m²/g) |
|---|---|---|---|---|
| Zinc oxide (zincite) | ZnO | 3.3 | 375 | 3.367 |
| Iron oxide (hematite) | α-Fe$_2$O$_3$ | 2.1 | 590 | 26.324 |
| Copper oxide (tenorite) | CuO | 1.2 | 1033 | 5.941 |
| Titanium dioxide (P25) | TiO$_2$ | 3.2 | 387 | 53.660 | a: Single Point BET

| Photo-Active Compound | Active Wavelength (nm) | Degradation After 60 Minutes (%) | Rate (per minute) |
|---|---|---|---|
| ZnO | 375 | 11 | 0.0016 |
| $Fe_2O_3$ | 590 | 44 | 0.0096 |
| CuO | 1033 | 16 | 0.0034 |
| $TiO_2$ | 387 | 13 | 0.0023 |

FIG. 7

| Photo-Active Compound | Active Wavelengths (nm) | Degradation After 30 Minutes (%) | Rate (per minute) |
|---|---|---|---|
| 2:1 $Fe_2O_3 : CuO$ | 590, 1033 | 70 | 0.040 |
| 1:1:1 $ZnO : Fe_2O_3 : CuO$ | 375, 590, 1033 | 55 | 0.020 |

FIG. 11

MULTI-SPECTRAL PHOTOCATALYTIC COMPOUNDS

FEDERALLY SPONSORED RESEARCH OR DEVELOPMENT

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present disclosure is related generally to metal-oxide semiconductors and, more particularly, to photocatalysts.

Description of the Related Art

This section introduces aspects that may help facilitate a better understanding of the invention. Accordingly, the statements of this section are to be read in this light and are not to be understood as admissions about what is prior art or what is not prior art.

The reuse of waste water from various sources, known as water recycling, has been employed for non-potable uses (e.g., for agricultural irrigation) for several decades. In contrast, the reuse of water for potable applications is a developing area that requires higher levels of decontamination and purification than standard wastewater-treatment processes. One particular challenge in potable water reuse is the removal of trace amounts of pharmaceuticals, pesticides, and personal-care products. These contaminants tend to be small, organic molecules that persist through conventional wastewater treatment processes, thus meriting their identity as recalcitrant contaminants. Even in trace amounts, these contaminants can have negative effects on the environment (e.g., on aquatic life) as well as on public health.

Heterogeneous photocatalysis (where catalyst and reactant are in different phases) with metal-oxide semiconductors is an emerging technology for the removal of recalcitrant contaminants from wastewater. The cascade of reactions involved in photocatalysis is initiated by the absorption of a photon, which excites an electron from the valence band to the conduction band of the semiconductor thereby generating an electron-hole pair. The electron-hole pair can migrate to the material surface, where it reacts with surrounding water and dissolved oxygen to form reactive oxygen species ("ROS"). It is these ROS that participate in the oxidation of recalcitrant contaminants in solution, leading to the breakdown of target contaminants into benign byproducts.

BRIEF SUMMARY

According to aspects of the present disclosure, various combinations of three different metal-oxide photocatalysts with three different bandgaps are used to harvest multiple wavelengths of incident solar radiation and to thus efficiently degrade recalcitrant contaminants. The photo-catalysts used are from the class of transition metal oxides and are non-toxic compounds based on earth-abundant materials. In some embodiments, particles of the photocatalysts are formed to be greater in diameter than about 0.1 μm in order to make them easier to filter out after treating the contaminant. In some embodiments, the metal-oxide photocatalysts used are zinc oxide (ZnO) which is ultraviolet ("UV") active, hematite ($\alpha$-$Fe_2O_3$) which is active in the visible spectrum, and copper oxide (CuO) which is active in the near infrared ("IR") spectrum. Various combinations in various embodiments achieve measured contaminant degradation rates greater than the sum of the degradation rates of the individual photocatalysts that make up the combination.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 3 is a table of characteristics of transition metal-oxide compounds;

FIG. 7 is a table supplementing the information of FIG. 6;

FIG. 11 is a table showing the degradation rates achieved by two different combinations of metal-oxide photocatalysts;

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting to example embodiments of the invention.

As used herein, the singular forms "a," "an," and "the" are intended to include the plural forms as well, unless the context clearly indicates otherwise. It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two functions shown in succession may in fact be executed substantially concurrently or may sometimes be executed in the reverse order, depending upon the functionality and acts involved.

When using photocatalysts to degrade contaminants, for excitation of electrons between the valence and conduction bands of the semiconductor to occur, the energy of the incident photon must match the bandgap of the semiconductor. Thus, when a single semiconductor is illuminated with a broad-spectrum light, a large amount of the incident radiation is 'wasted.' Combining multiple photoactive materials is a logical method to maximize light harvesting from broad-spectrum sources (e.g., from sunlight). One common approach to combining photocatalysts is to fabricate core/shell structured materials. Many of these composite materials, especially core/shell particles, show promising degradation rates, but they are quite complicated to synthesize and may not be suitable for large-scale fabrication. In addition, many of the particles presented in the literature are nano-sized, making them difficult to remove from a water-treatment train.

Figure 1:
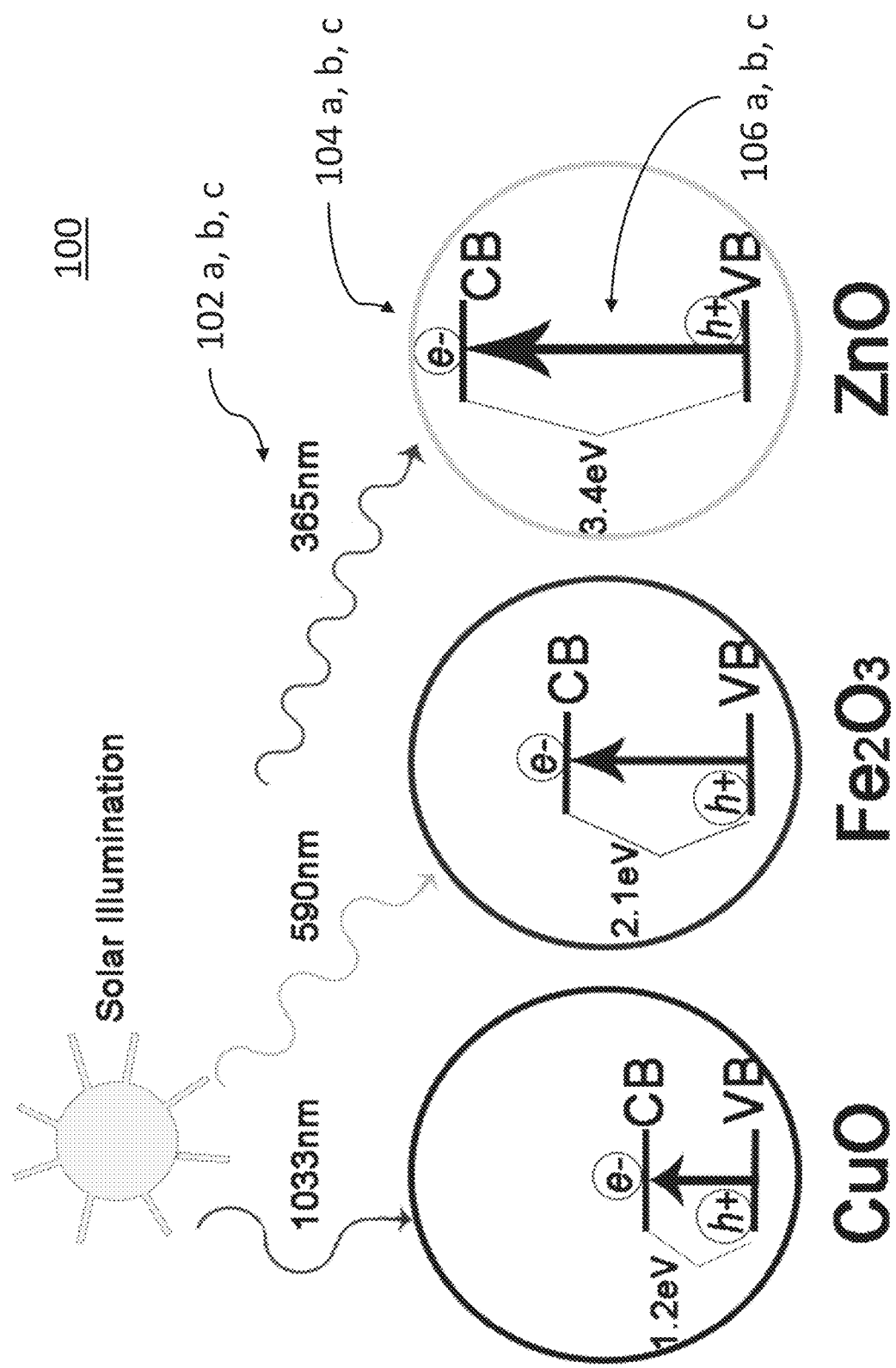
FIG. 1 is a schematic overview of a representative environment in which the techniques of the present disclosure may be practiced.

The techniques of the present disclosure address these and other shortcomings of the known art. FIG. 1 shows a general environment 100 in which multi-spectral photocatalysis can be practiced. Broad-spectrum light 102 $a$, $b$, $c$ (in FIG. 1, sunlight) is directed to a variety of particles 104 $a$, $b$, $c$ consisting substantially of metal-oxide semiconductor photocatalysts. To address the issue of wasting incident radiation 102 $a$, $b$, $c$, the photocatalysts 104 $a$, $b$, $c$ are chosen to have different bandgaps 106 $a$, $b$, $c$ and thus to respond to different wavelengths of the incident radiation 102 $a$, $b$, $c$.

In the embodiment illustrated in FIG. 1, first particles 104$a$ include CuO whose bandgap 106$a$ of 1.2 eV makes it particularly active when hit with near-IR light 102$a$ (shown as 1033 nm in FIG. 1). The second type of particle 104$b$ includes hematite with a bandgap 106$b$ of 2.1 eV which makes it most efficient when harvesting light in the visible spectrum 102$b$ (exemplified by 590 nm light in FIG. 1). Finally, a third type of particle 104$c$ includes ZnO with a bandgap 106$c$ of 3.4 eV making it most susceptible to ultraviolet light 102$c$ (365 nm in FIG. 1).

Together, these three exemplary photocatalysts 104 $a$, $b$, $c$ harvest a significant amount of the incident radiation 102 $a$, $b$, $c$ and can use the harvested radiation to degrade recalcitrant contaminants more efficiently than could any of the photocatalysts 104 $a$, $b$, $c$ working alone. In fact, the experimentally measured degradation rates of some combinations of photocatalysts 104 $a$, $b$, $c$ actually exceed the sum of the degradation rates of the individual photocatalysts 104 $a$, $b$, $c$ that make up the combination. This synergistic effect is discussed more thoroughly below.

Experimental Materials and Methods
Materials

In the experiments, all reagents were used as received without further purification: zinc nitrate hexahydrate (purum p.a. crystallized, ≥99.0%; Sigma Aldrich), hexamethylenetetramine (ACS Reagent, ≥99.0%; Sigma Aldrich), iron (III) chloride hexahydrate (puriss. p.a., Reag. Ph. Eur., ≥99%; Sigma Aldrich), sodium phosphate monobasic dihydrate (purum p.a., crystallized, ≥99.0%; Sigma Aldrich), copper (II) nitrate trihydrate (purum p.a. 98-103%; Sigma Aldrich), sodium hydroxide (Certified ACS reagent; Fisher Scientific), methyl orange (Indicator, Reag, Ph. Eur.; Sigma Aldrich), diclofenac sodium salt (Sigma Life Sciences), salicylic acid (ACS Reagent, ≥99.0%; Sigma Aldrich), 4-chlorophenol (≥99%; Aldrich Chemistry), penicillin G sodium salt (≥98%; Sigma Life Sciences).

Methods

Zinc Oxide Synthesis: Zinc oxide particles were synthesized hydrothermally in aqueous solution according to procedures described in the literature by Munoz-Espi et al. In a typical synthesis, 95 mL 0.016 M zinc nitrate hexahydrate was stirred and heated to 100° C. Hexamethylenetetramine ("HMTA," 0.210 g, 0.00150 mol) was dissolved in 5 mL of Millipore water and added to the reaction mixture. The reaction mixture was heated while stirring for 90 minutes and then cooled and filtered to collect precipitated ZnO particles. ZnO particles were washed with water and ethanol (1×) and then dried under vacuum.

Hematite Synthesis: Spindle-type hematite particles were prepared as described by Fransden et al. Iron (III) chloride hexahydrate (1.08 g, 0.0040 mol) was dissolved in a solution of monosodium phosphate (200 mL, 0.45 mM). The solution was placed in a sealed glass media vessel and aged at 100° C. for 2 weeks. Following aging, the solution was cooled, and then precipitated hematite particles were collected via vacuum filtration. Particles were washed with water and ethanol and then dried under vacuum.

Copper (II) Oxide Synthesis: Copper oxide particles were synthesized hydrothermally in aqueous solution using procedures previously reported in the literature by Vaseem et al. In a typical synthesis, 50 mL 0.1 M copper nitrate trihydrate were combined with 50 mL 0.1 M HMTA and stirred while heating to 100° C. Once heated, 8 mL 1M NaOH were added to the reaction mixture. The reaction mixture was heated for an additional 90 minutes. After cooling, the precipitated copper oxide particles were collected via vacuum filtration, rinsed with water (2×) and ethanol (1×), and dried under vacuum.

Figure 2:
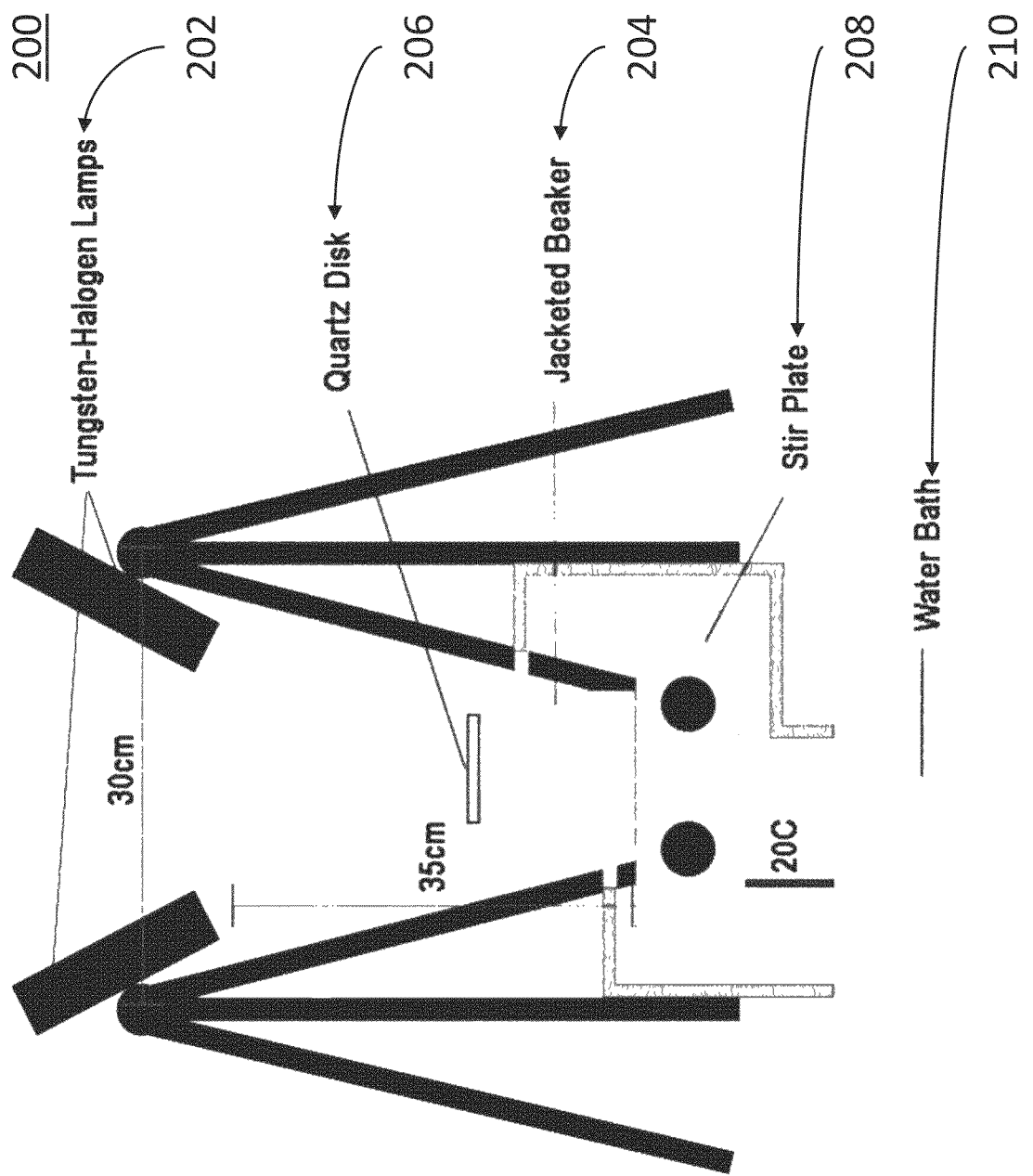
FIG. 2 is a generalized schematic of a photocatalytic reactor setup.

Photocatalytic Reactor Setup and Reaction Procedure: Turning to FIG. 2, the reactor setup 200 included two tungsten halogen lamps 202 (ASI Illuminator, 50 W) on tripods. The lamps 202 were pointed at a stir plate 208 on which a glass jacketed beaker 204 was placed. The lamps 202 were positioned 35 cm above the stir plate 208 and 30 cm apart from each other. The lamps 202 were angled such that their beams were directed at the center of the stir plate 208 and were allowed to warm up for at least 10 minutes before each reaction. The light intensity incident on the stir plate 208 in this configuration was characterized using a calibrated spectroradiometer.

In a typical photocatalytic reaction with methyl orange ("MO"), aqueous MO solution (40 mL, 25 mM) was placed in the glass jacketed beaker 204. Then 30 mg of the photocatalyst was added to the solution. A quartz disk 206 was placed on top of the beaker 204. Water from a water bath 210 maintained at 20° C. was pumped through the cooling layer of the beaker 204. The mixture of photocatalyst and contaminant was stirred in the dark for 15 minutes, after which time a 3 mL aliquot was withdrawn (t=0 minutes point). After taking this aliquot, the beaker 204 was illuminated. 3 mL aliquots were taken every 15 minutes for analysis by UV-Vis spectroscopy ("UV-Vis") and liquid chromatography mass spectrometry ("LC-MS"). Aliquots were filtered through 0.20 μm Luer-lok filters (Millex PTFE) to remove the photocatalyst and were then placed in a quartz cuvette (for UV-Vis analysis) or vial (for LC-MS).

Instrumentation

Optical Microscopy: Crystalline photocatalytic materials were imaged between crossed polarizers in transmission on an Olympus BX50 microscope with a 50× lens.

The transition metal-oxide photocatalytic samples were prepared for imaging by scanning electron microscopy ("SEM") by dropcasting onto silicon wafers with ethanol carrier solvent. The samples were then imaged with a field emission scanning electron microscope operating at 5 kV.

BET Analysis

Nitrogen adsorption was used to determine the surface area of the metal-oxide photocatalyst materials.

X-Ray Diffraction Phase Analysis

Powder X-ray diffraction ("pXRD") was used to determine the phase purity of the photocatalyst samples.

UV-Vis Spectroscopy

A Genesys 10S UV-Vis Spectrophotometer was used for spectroscopic analysis. Samples in 1×1×4.5 cm quartz cuvettes (Starna Cells, Inc.) were scanned from 650 to 200 nm at an interval of 1 nm.

LC-MS

LC-MS separation of contaminants and degradation products was conducted on a Thermo Fisher Accela pump and PDA detector system with an MSQ Plus mass detector. A Zorbax Eclipse Plus C18 column (4.5×150 mm, 5 μm) was used with a gradient from 30% acetonitrile and 70% 10 mM ammonium acetate to 60% acetonitrile and 40% ammonium acetate over 10 minutes at a flow rate of 600 μL/minute. The mass detector's ESI probe was run in negative ion mode with a cone voltage of 75 V. For each run, 10 μL of sample were injected into the column.

Results

Approach

In order to increase the rate of contaminant degradation by low cost, earth-abundant, transition metal ("TM") oxides, we chose to engineer a composite material based on a combination of multiple photo-active transition metal oxides. We selected three different oxide compounds with bandgaps in three distinct regions of the solar spectrum: UV, visible, and near IR. In particular we selected zinc oxide, iron oxide, and copper oxide (see FIG. 3). We synthesized these individual oxide materials using low impact, aqueous-based methods based on published methods. Specifically, we selected these methods because they allowed us to produce well defined crystals with diameters greater than 0.1 μm.

Photocatalyst Material Characterization

Figure 4:
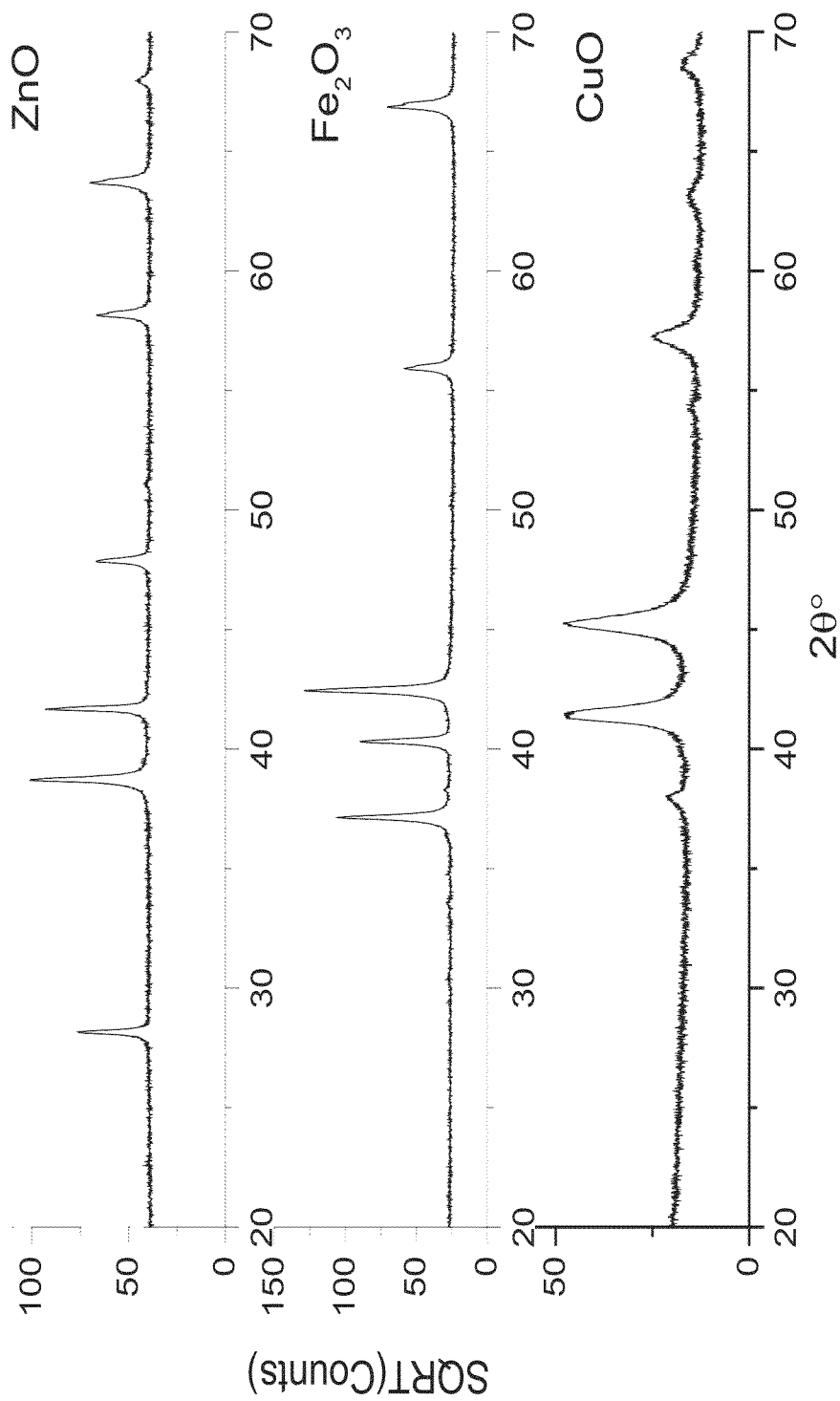
FIG. 4 shows the crystal-phase analysis (by powder X-ray diffraction) of three metal-oxide photocatalysts.
Figure 5:
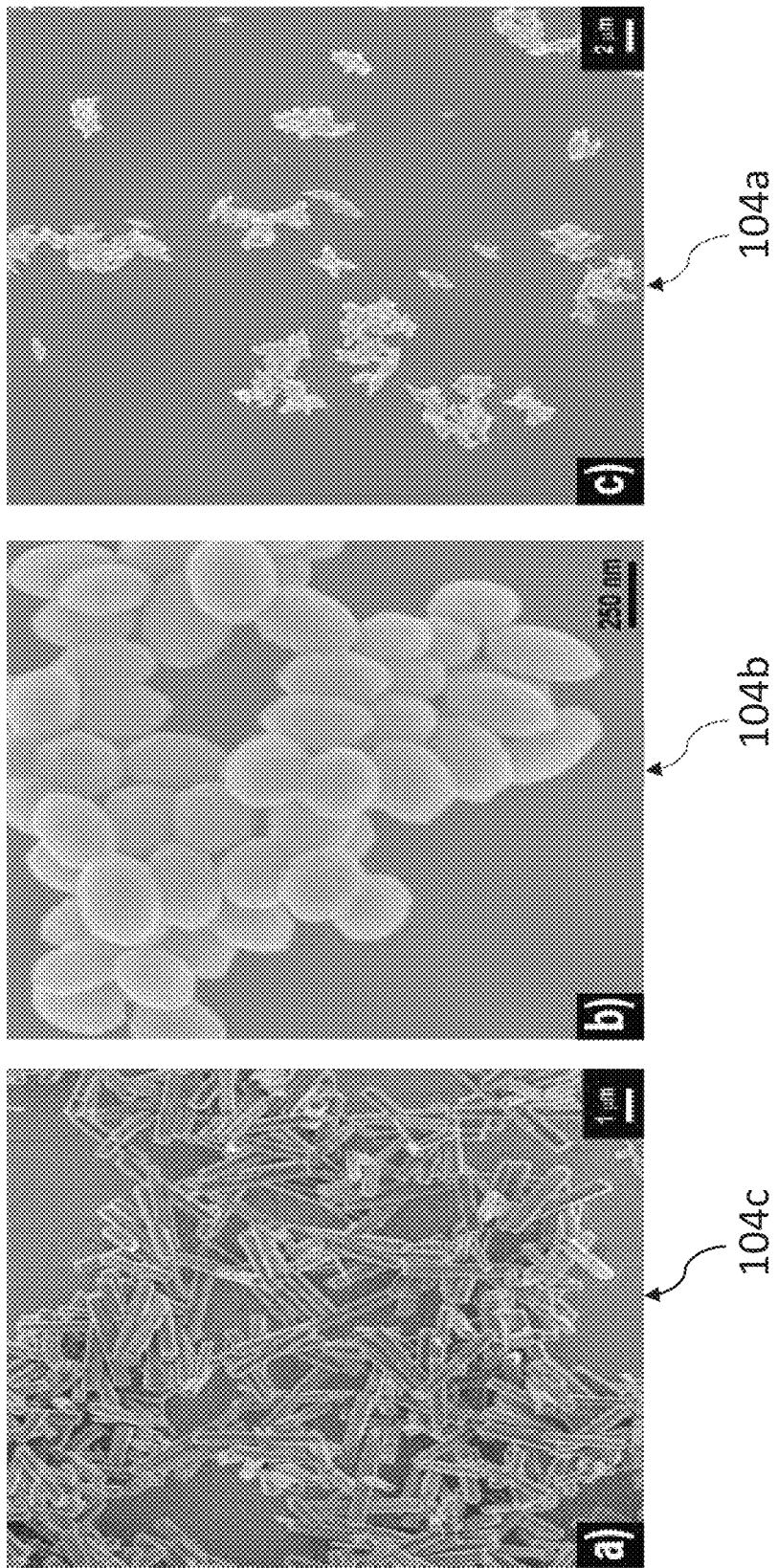
FIGS. 5a, 5b, and 5c are scanning electron micrographs of crystals of three metal-oxide semiconductor photocatalysts (ZnO, $Fe_2O_3$, and CuO, respectively)

All oxide materials were formed in phase pure batches, as characterized by pXRD (see FIG. 4). The crystallinity of the TM oxide materials was characterized by optical microscopy ("OM"), and the morphology was imaged by SEM (FIGS. 5a, 5b, and 5c). Consistent with the smooth, faceted surface structures seen in SEM images, the individual ZnO rods were seen to extinguish light under rotation, implicating them as single crystals. The $Fe_2O_3$ spindles exhibited rough surfaces in SEM and were seen to exhibit a Maltese cross under cross-polarized light, consistent with a structure that contains a crystalline order composed of highly oriented domains. The CuO materials appeared, by both SEM and OM, to be composed of multiple large domains with less intra-granular registry, most similar to a crystalline aggregate. We probed the surface area of the particles by nitrogen adsorption with the BET technique (see FIG. 3). Consistent with the observed surface structures, the smooth ZnO particles have the lowest surface area; the rough $Fe_2O_3$ had the highest surface area; and the intermediate CuO particles had an intermediate surface area.

Baseline Photocatalytic Performance of Individual Metal Oxides

Figure 6:
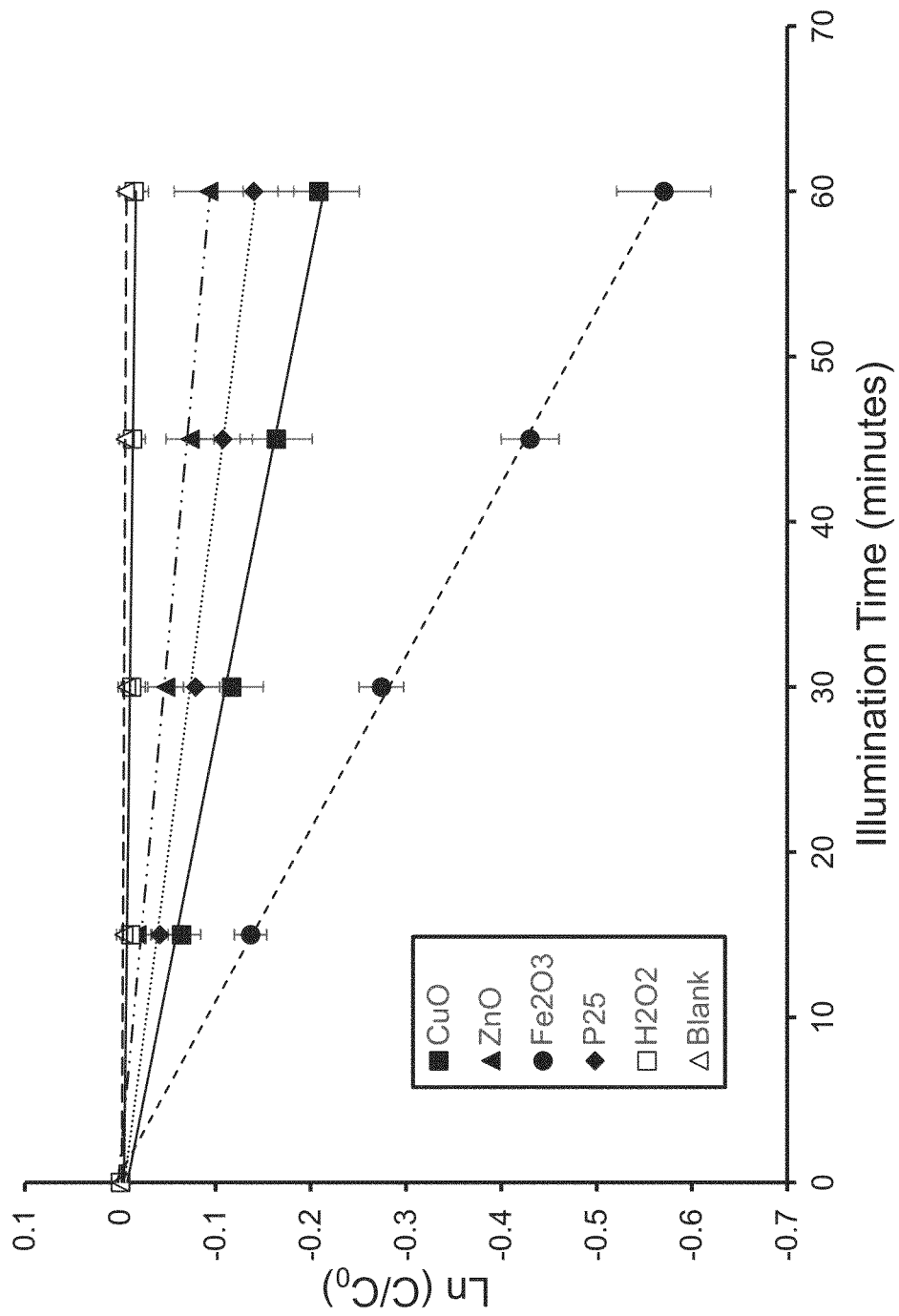
FIG. 6 is a graph of the contaminant-degradation rates of individual metal-oxide photocatalysts shown in reference to $TiO_2$ (P25)

We chose to use MO as a model reference contaminant throughout our experiments and first studied the MO degradation rate of the individual photocatalysts. All of the photocatalysts were capable of degrading MO under broad-spectrum illumination (FIG. 6), although their first order rates and overall percent degradation were different (FIG. 7). With the relative rates ranking as $Fe_2O_3$>CuO>$TiO_2$>ZnO, it appears that the variability is influenced by the available light at the required wavelength for each photocatalyst.

Performance of Photocatalysts in Combination Under Multi-Spectral Light

To probe the hypothesis that photocatalytic degradation of small molecule contaminants could be increased by the use of a broad-spectrum active photocatalysts, we made combinations of the three metal-oxide materials: ZnO (UV), $Fe_2O_3$ (visible), and CuO (near IR). We used a ternary approach and made systematic combinations of the three materials by varying x, y, & z for the general formula $(ZnO)_x(Fe_2O_3)_y(CuO)_z$. For each combination, we performed photocatalytic degradation of MO and used first-order kinetics to assess the performance of the combinations.

Figure 8:
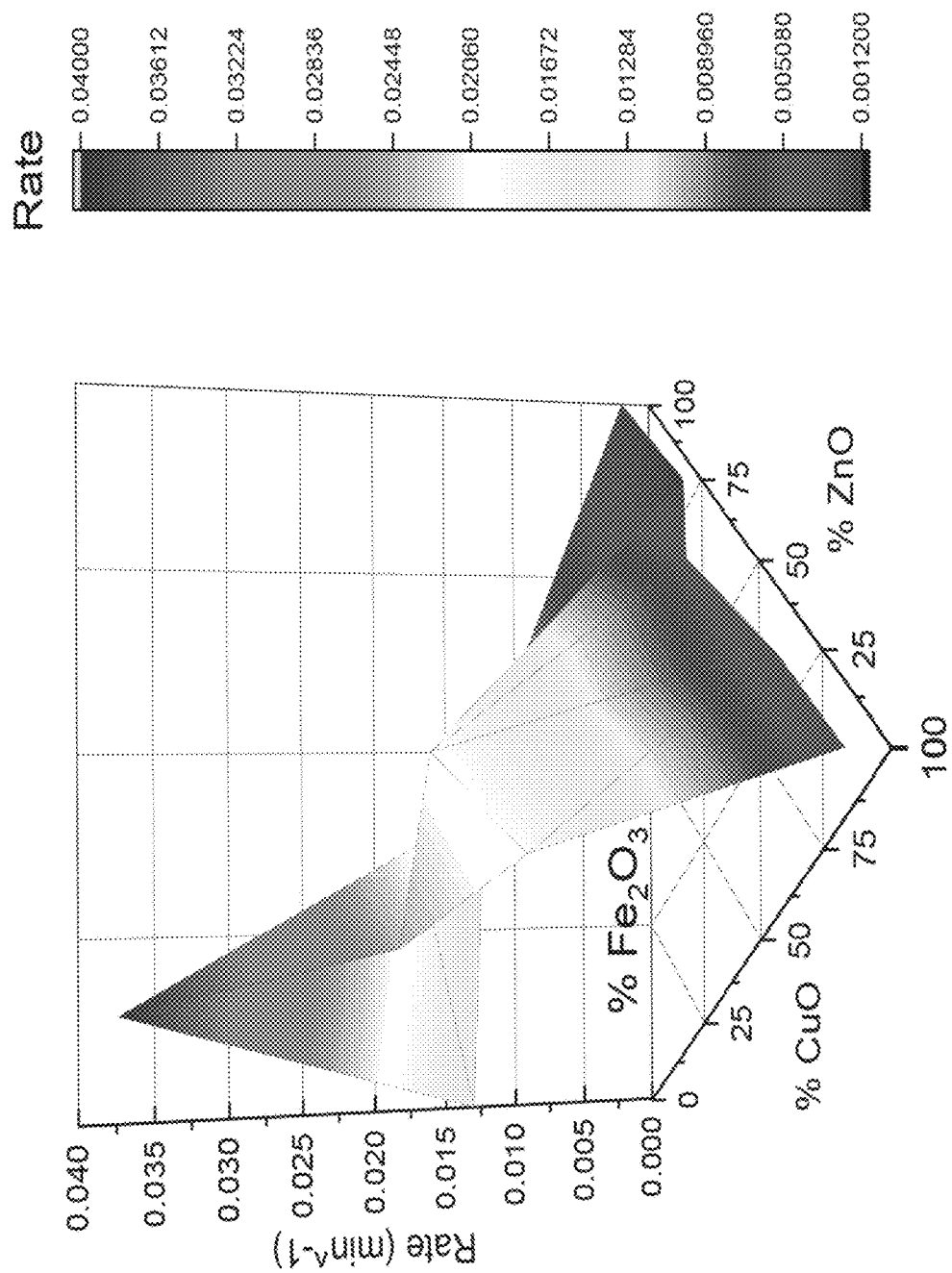
FIG. 8 is a three-dimensional heat map of the first-order kinetics for the degradation of methyl orange by blends of three metal-oxide photocatalysts.
Figure 9:
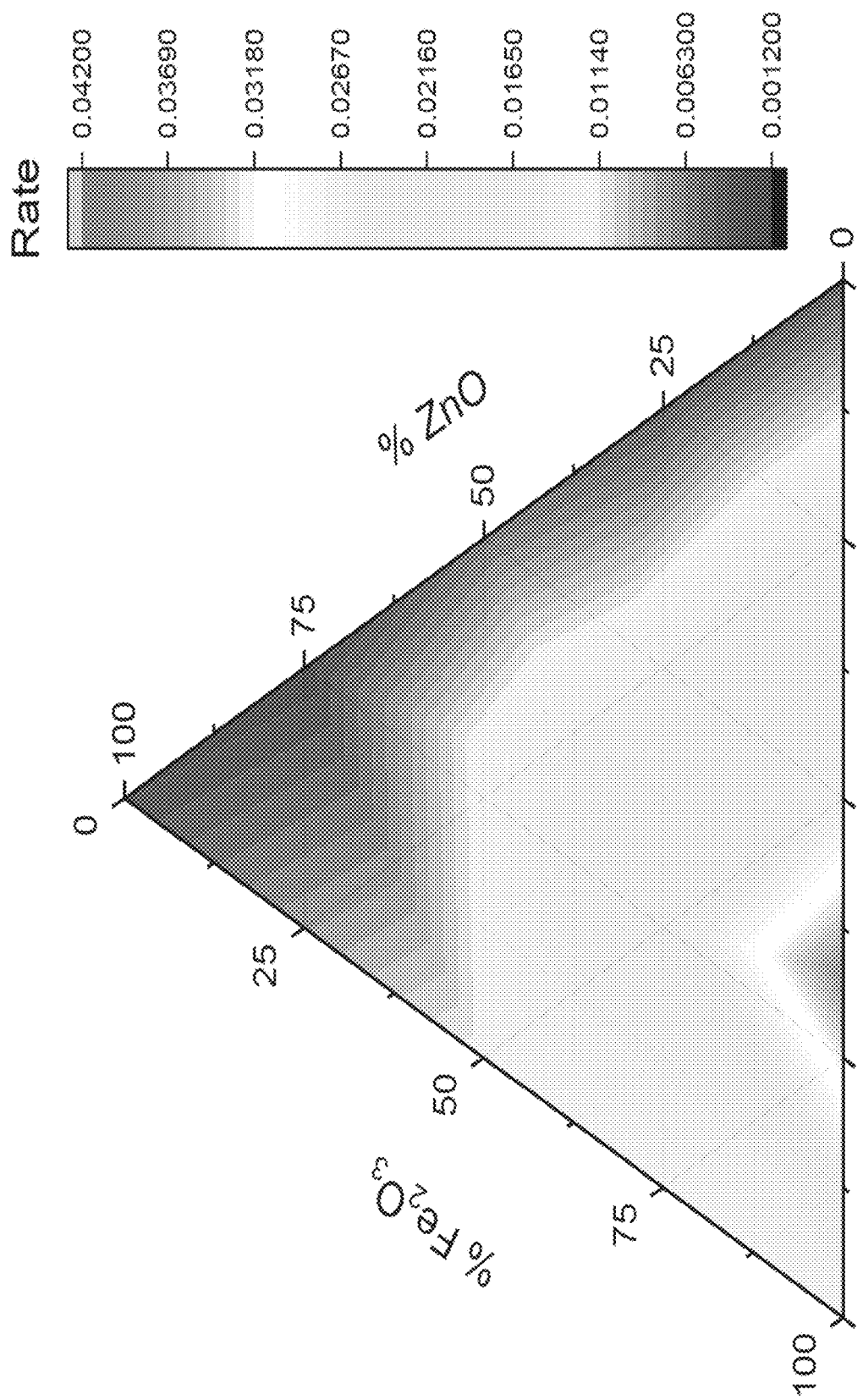
FIG. 9 is a two-dimensional version of the heat map of FIG. 8.
Figure 10:
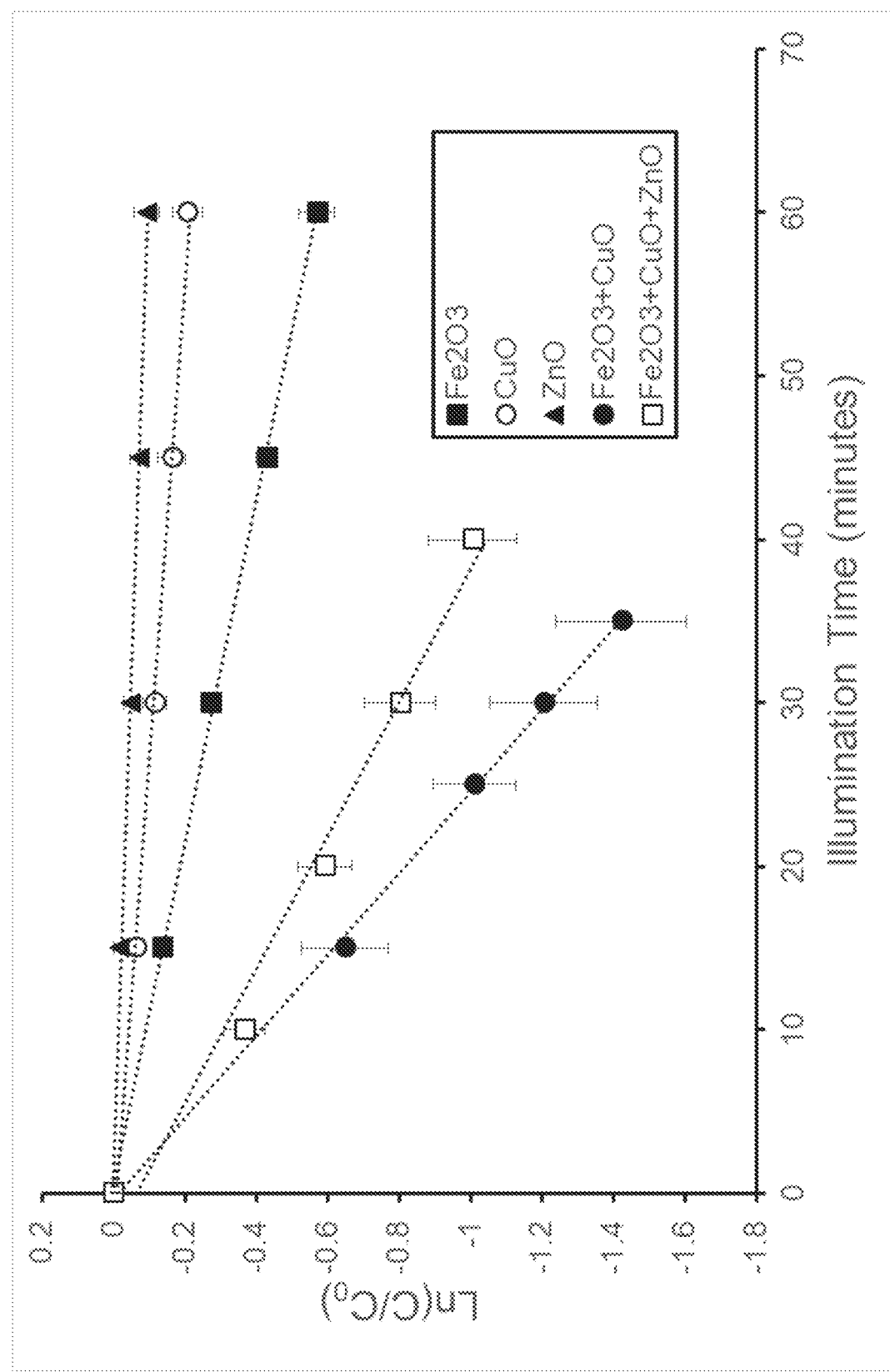
FIG. 10 is a graph showing the rates of degradation of methyl orange by various metal-oxide photocatalysts alone and in combination.

The ternary plots (FIGS. 8 and 9) illustrate two distinct peaks in the degradation rate for the photocatalytic material combinations: one at equal weight percentages for each of the three components and another with 66% $Fe_2O_3$ and 33% CuO. It is noteworthy that the combination of $Fe_2O_3$ and CuO yields greater reaction kinetics than all three materials together (FIG. 10). Additional unexpected results include the finding that the measured rates for the combination materials exceed the sum of the individual rates (FIG. 11). For example, the MO degradation rate for $Fe_2O_3$ and CuO in a 2:1 weight ratio combination is 0.040 per minute, which is three times greater than the sum of their individual rates (0.013 per minute) (compare FIG. 7).

The synergistic effects of the metal-oxide photocatalyst combinations is unexpected when experimental aspects are considered. First, due to competition for a fixed incident light flux and peroxide concentration, one may predict that the MO degradation rates for the combination materials would be decreased. Yet, we observe a 3-fold enhancement of the rates. The different MO degradation rates for the 2- and 3-material combinations is also unexpected. One may predict that the presence of ZnO with the other two oxides would increase (UV) light harvesting, enhancing the MO degradation rate. However, when compared to the 2-material combination, it would appear that ZnO is quenching the synergy between $Fe_2O_3$ and CuO. These results imply that the synergy is related to ROS generation and the possibility that ZnO may generate different and incompatible ROS as compared to $Fe_2O_3$ and CuO.

Short Exploration of Photocatalyst Synergy

We chose to further investigate the result that the presence of ZnO in the metal-oxide photocatalyst combination material did not enhance the MO degradation kinetics to the extent measured for $Fe_2O_3$ and CuO. Working from the hypothesis that ZnO catalyzed the formation of different ROS than did $Fe_2O_3$ and CuO, we performed additional experiments adding and removing hydroxyl radical ROS species from the degradation experiments.

The addition of peroxide to photocatalytic reactions supplies an ROS precursor: Each molecule of peroxide can split into two hydroxyl radical species. It is the hydroxyl radical species which can attack the bond structure of small contaminant molecules, leading to their degradation in water. To first probe ROS in our metal-oxide photocatalyst materials, we performed serial additions of peroxide to the reactions and monitored the kinetics for MO degradation.

Figure 12:
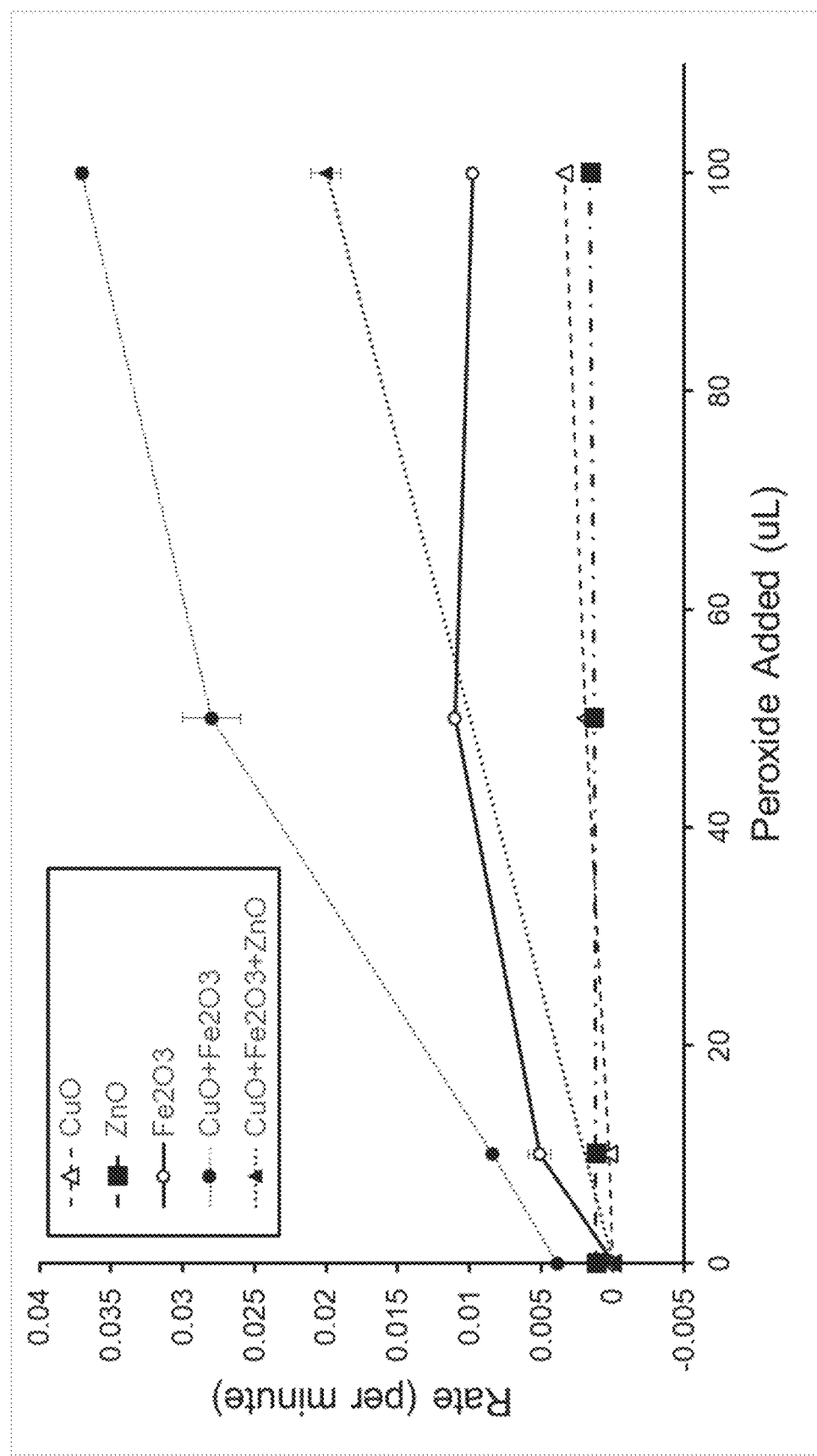
FIG. 12 is a graph showing the effect of peroxide, a source of hydroxyl radical ROS, on the degradation rate of methyl orange by various metal-oxide photocatalysts alone and in combination.

Very different dependencies on peroxide were observed for the metal-oxide photocatalytic experiments (FIG. 12). While the rate for MO degradation by CuO was only marginally enhanced, the 2-material combination showed a steep dependence on increasing peroxide. The key result from this set of experiments is the observation that the rate for MO degradation by ZnO is not affected by the presence of peroxide. In other words, ZnO doesn't catalyze reactions that involve hydroxyl radical species. Other noteworthy results include the zero-point degradation rate of 0.003 per minute for the 2-oxide material and 0.001 per minute for ZnO.

The high zero-point degradation rate for the $Fe_2O_3$/CuO compound in the absence of peroxide is consistent with the reported ability of CuO to catalyze the formation of hydroxyl radicals in the absence of light. Thus we suspect that the synergistic effects of the 2-material combination ($Fe_2O_3$/CuO) is related to the strong dependency of $Fe_2O_3$ catalysis on hydroxyl radicals and to the role of CuO as a catalyst for hydroxyl radical generation from peroxide and other oxygen species in solution.

Figure 13:
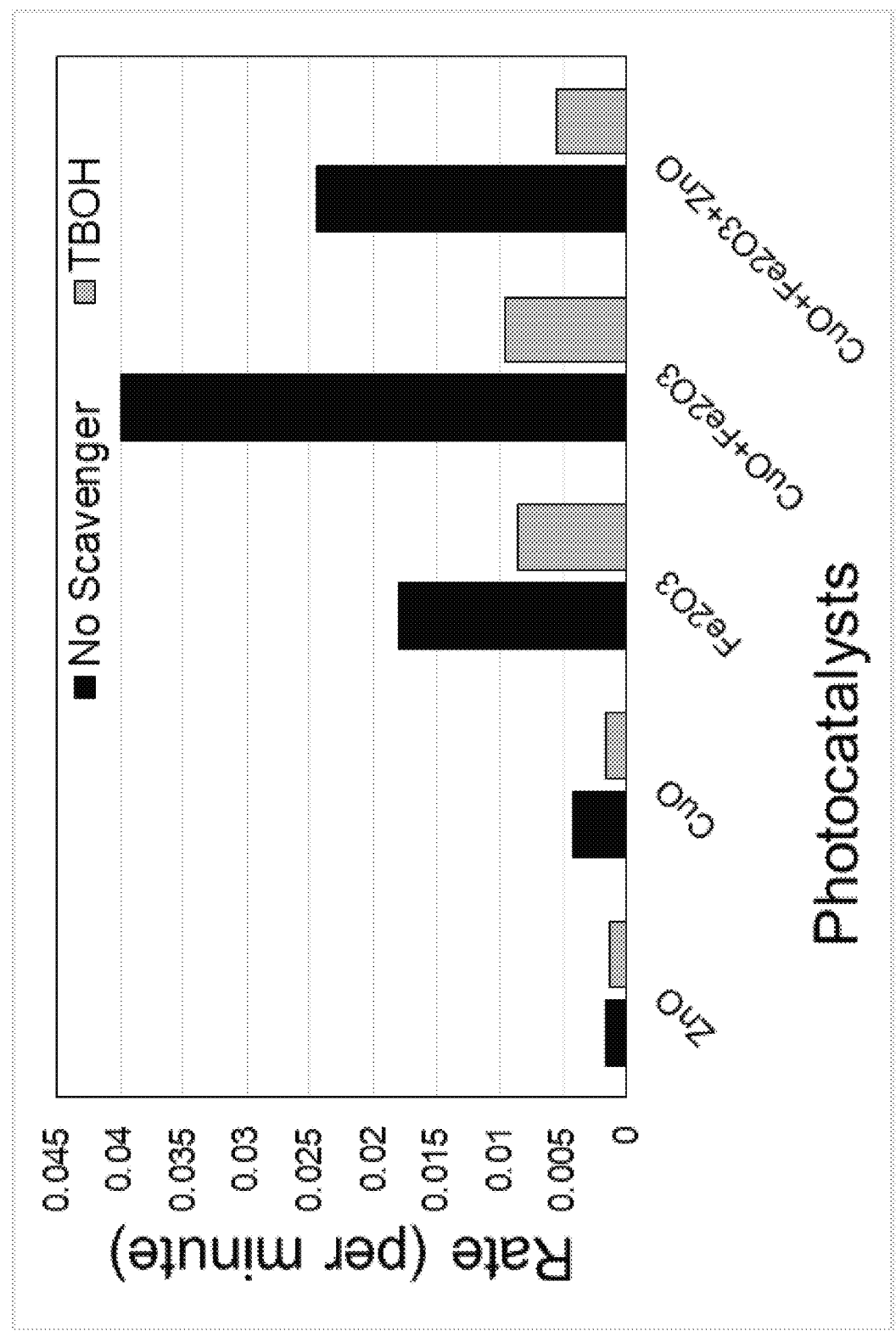
FIG. 13 is a chart showing results of experiments with tert-butanol, a scavenger of hydroxyl radical ROS.

To support our findings that ZnO photocatalytic reactions are governed by different ROS than are $Fe_2O_3$ and CuO reactions, we performed a set of experiments with tert-butanol, a scavenger of hydroxyl radical species. Upon removal of hydroxyl radical species from photocatalyzed experiments with ZnO, the MO degradation rates aren't appreciably affected (FIG. 13), indicating the minor role that hydroxyl radical species play in ZnO catalyzed reactions. On the other hand, the 2-material combination photocatalyst ($Fe_2O_3$/CuO) undergoes a four-fold rate decrease when hydroxyl radicals are consumed by the presence of tert-butanol.

The results of the experiments of adding and withdrawing hydroxyl radical species into the metal-oxide photocatalytic experiments present a consistent story for the different mechanisms that operate in wide bandgap (ZnO) experiments and in smaller bandgap ($Fe_2O_3$ and CuO) reactions. First, the conduction band edge of ZnO is above the reduction potential for $O_2$. This means that $O_2$ reduction to $^1O_2^-$ is a lower energy process than the formation of an electron-hole pair, which can reduce peroxide to water thereby quenching hydroxyl radicals from solution. Smaller bandgap materials, such as $Fe_2O_3$ and CuO, have their conduction band edges below this value. Thus, they are unable to form $^1O_2^-$ (singlet oxygen), and so the hydroxyl radical mechanisms dominate. In a system containing both types of materials (wide and small bandgap), the conflicting mechanisms present interference, reducing the overall kinetics for photocatalyzed degradation reactions. On the other hand, in systems where complimentary reactions are occurring in solution, such as is the case with the 2-material combination ($Fe_2O_3$/CuO), synergistic increases in rate can be achieved, leading to high degradation rates for molecular contaminants in water.

Figure 14:
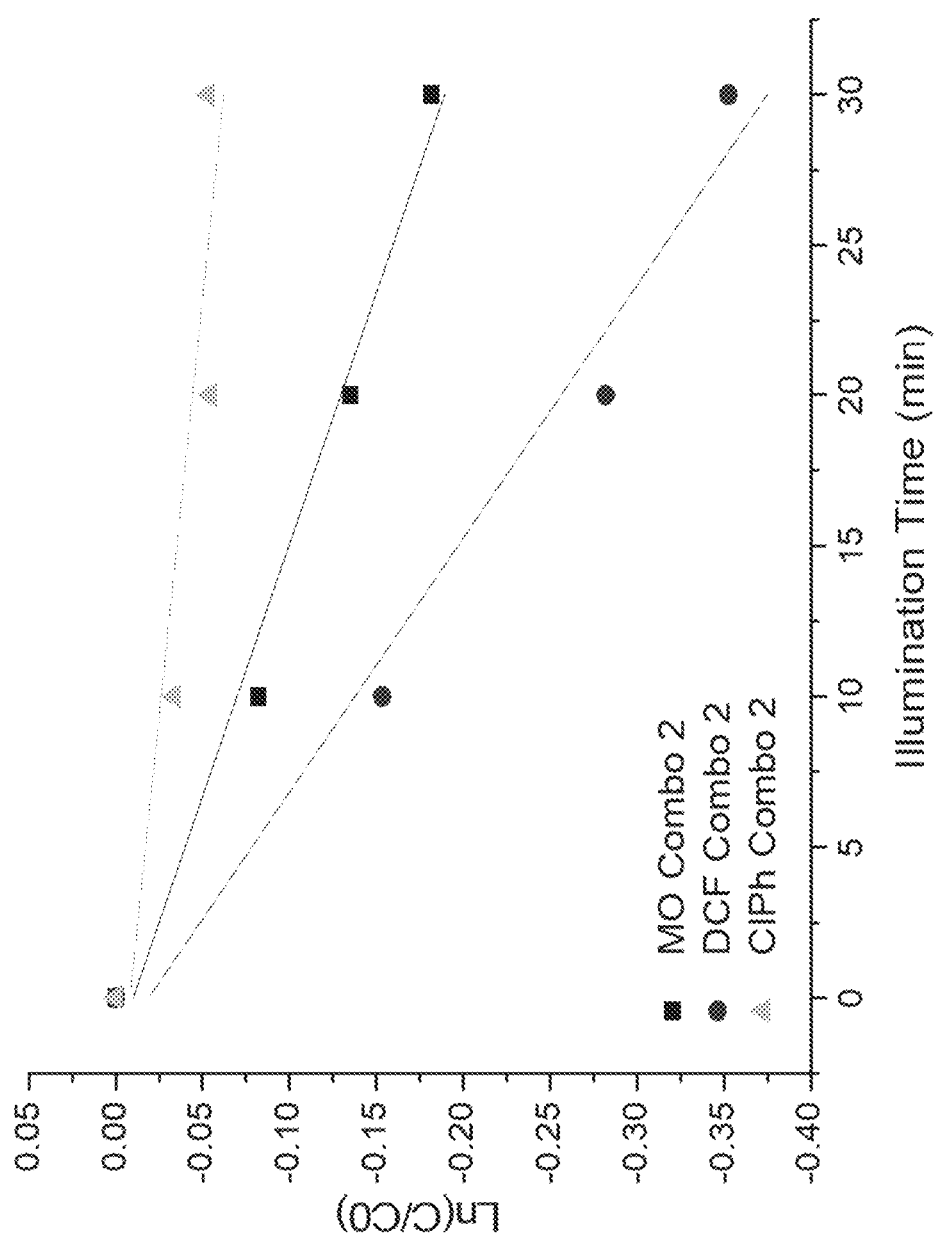
FIG. 14 is a graph showing degradation rates for three contaminants (methyl orange, diclofenac, and chlorophenol) by a multi-catalyst mixture (y=z=1 in the formula $(Fe_2O_3)_y(CuO)_z$)
Figure 15:
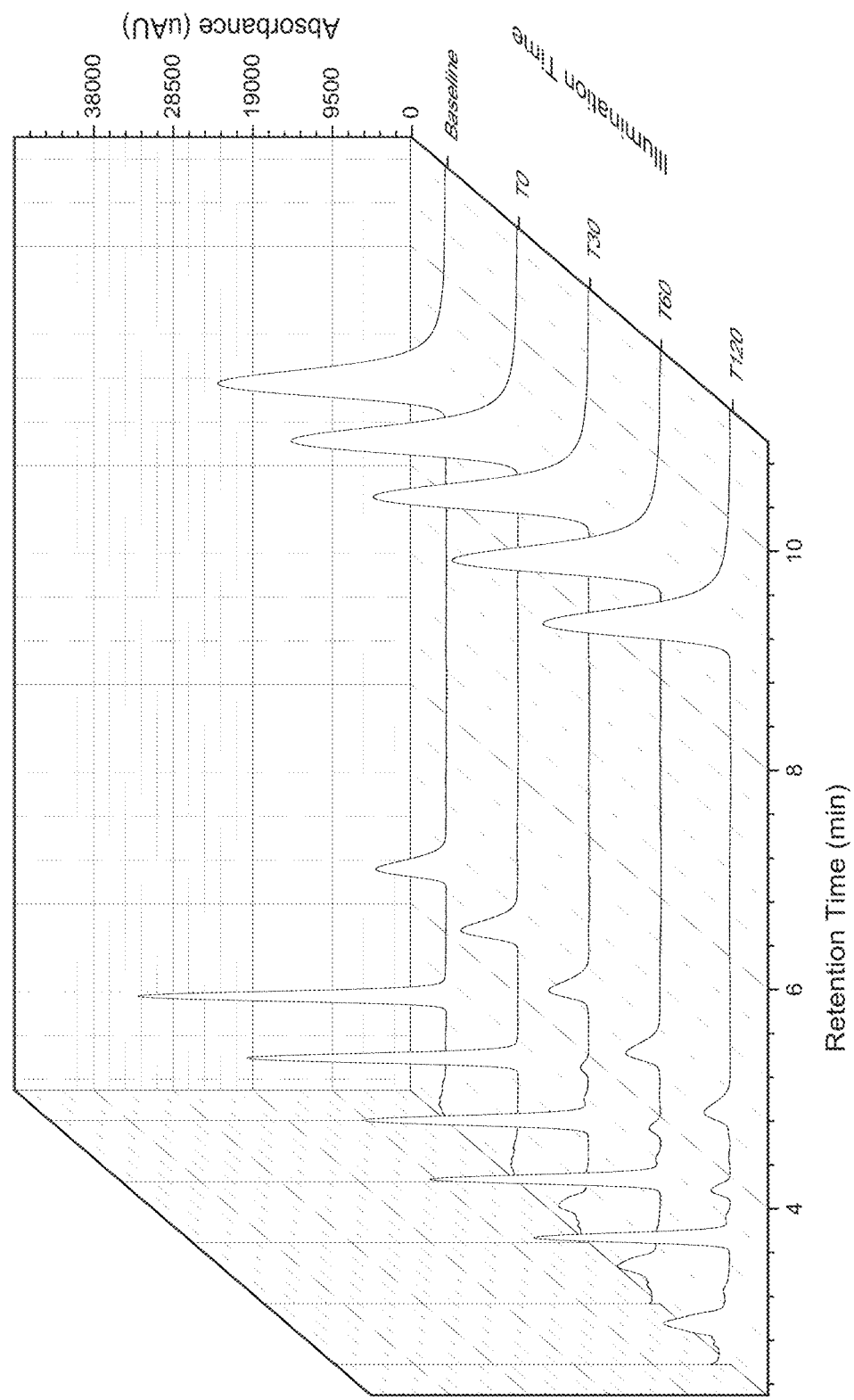
FIG. 15 is a chromatogram from the same experiments illustrated in FIG. 14 showing decreases in contaminant peaks and the emergence (and subsequent degradation) of by-product compounds.

Degradation of Multi-Contaminant Systems with Multi-Spectral Photocatalytic Material The multi-spectral photocatalytic compounds also work to degrade systems containing multiple contaminants. See the results in FIGS. 14 and 15.

Discussion

Generally, heterogeneous catalysis proceeds in three broad steps: i) adsorption onto the catalyst surface, ii) surface reaction, and iii) finally desorption from the surface. The simplest kinetic model for these reactions is based on the Langmuir adsorption isotherm, which assumes an ideal surface. In many cases, the adsorption and desorption happen quickly relative to the surface reaction, making the surface process the rate-determining step. This means that the reaction rate is determined by the amount of reactant adsorbed on the surface, which is proportional to the partial pressure (or concentration) of this reaction in solution. This leads to an expression for the rate that takes the form:

$$\frac{k*(K*\text{partial pressure})}{1+(K*\text{partial pressure})}$$

where k is the rate constant, and K is the equilibrium constant for the system. When the partial pressure of the reactant is low (<<1), the expression simplifies to a first order rate expression, i.e., r~k(partial pressure). Thus when the reactant concentration is low relative to the available surface, the degradation should conform approximately to a first-order kinetic model.

The actual mechanisms occurring during photocatalytic reactions are more complex than these three simple steps. In reality, there are a variety of possible pathways involving a variety of potential reactive oxygen species. As previously mentioned, the electron-hole pair generated on the photocatalyst surface by the absorbed photon can participate in any number of electron-transfer reactions, which eventually lead to the oxidation of the reactant. However, photocatalytic reactions reported in the literature conform to a first-order model.

The rate of photocatalytic reaction can be affected by several factors. The light intensity incident on the photocatalyst has a direct effect on the rate of degradation, with increased light intensity increasing degradation rates. The pH of the contaminant solution has a varied effect depending on the catalyst and the contaminant, but $TiO_2$ is known to perform better at mildly acidic pH (3-5), especially for degradation of phenols. Zinc oxide has been demonstrated to perform better at neutral or alkaline pH for degradation of dyes such as methyl orange and rhodamine B. The presence of peroxide ($H_2O_2$) and dissolved oxygen ($O_2$) in the contaminant solution can also increase the photocatalytic reaction rate, as they can act as sources of reactive oxygen species. Effective removal of recalcitrant contaminants requires optimization of these conditions for a variety of possible contaminants.

Figure 16:
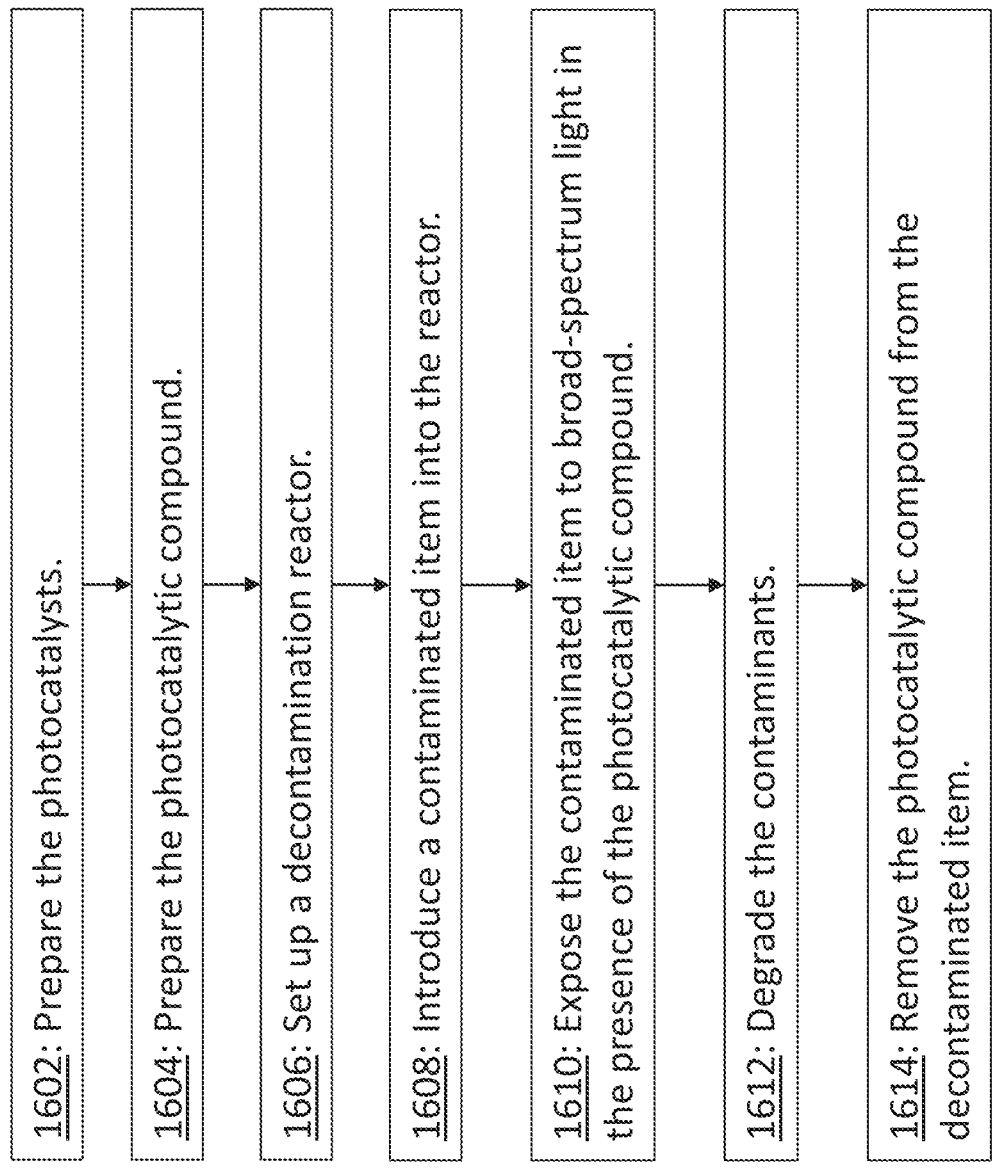
FIG. 16 is a flowchart of a representative method for using photocatalysts to degrade contaminants.

Exemplary Method of Using a Multi-Photocatalytic Material to Degrade Contaminants As an overview, FIG. 16 presents an exemplary method 1600 for using the materials discussed above in real world situations. The method 1600 begins in step 1602 where the metal-oxide photocatalysts are prepared. While the procedures discussed above may serve as guidelines, many details of this step 1602 depend upon the particulars of the situation including what type of contaminants are present, in what expected quantities, and in what type of contaminated item. If, for example, the contaminated item is water or another liquid, then in some embodiments the photocatalysts will be formed into particles to be dispersed throughout the contaminated liquid. The particles will be small to increase their overall surface area but not too small: Particles above about 0.1 µm in diameter (plus or minus 10%) are more readily filtered out of the liquid when the decontamination is accomplished.

After making the individual photocatalysts, they are combined into a multi-catalyst compound in step 1604. For example, a mix of hematite, CuO, and ZnO in a 1:1:1 molar ratio could be chosen, although in some situations (as discussed above), a 1:1 molar ratio mix of hematite and CuO works even better. (All ratios are approximate, with acceptable ranges depending upon the exact photocatalysts used but usually with a margin of plus or minus 10%.) Some embodiments use a specific mixture to get the synergistic effects discussed above. In these cases, the effects are considered to be synergistic when the degradation rate for the mixture is at least 20% greater than a sum of the degradation rates of the individual photocatalysts in the compound (as measured for the particular contaminant being degraded).

Some of the details of steps 1606 (set up a contaminant reactor) and 1608 (introduce the contaminated item into the contaminant reactor) depend upon the nature of the contaminated item. For a contaminated liquid, the reactor can be a greatly expanded version of the experimental setup shown in FIG. 2. Here, the photocatalytic compound is mixed into the contaminated liquid. In another example, the contaminated item is air or another gas in which case the photocatalytic particles can be embedded into a filter, such as the well known folded paper HVAC filters. The contaminated gas is then wafted through the filter. As a final example, if the contaminated item is a surface to be cleaned, then the photocatalysts may be mixed into a gel or liquid that can be spread across the surface, that can hold the photocatalysts in place while they work, and that can be easily removed from the surface afterwards.

When everything is ready, broad-spectrum light shines onto the photocatalysts and the contaminated item in step 1610. As discussed above, the light activates the photocatalysts which in turn break down the contaminants in step 1612. The preferred nature of the "broad-spectrum" light depends upon the bandgaps of the specific photocatalysts used. Other details depend upon the particulars of the decontamination set up including, for example, how long the decontamination process lasts (if batch oriented), how fast the contaminated item can move through the reactor (if the item is a liquid or a gas), whether continuous contaminant concentration monitoring is to be used, etc.

Finally, the photocatalysts are removed from the now decontaminated item in step 1614. This may involve filtering the photocatalysts out of a decontaminated liquid, wafting the decontaminated air away from a photocatalyst-bearing filter, or wiping a photocatalyst-bearing gel from a decontaminated surface.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A photocatalytic compound comprising:
   a first metal-oxide semiconductor photocatalyst with a first bandgap; and
   a second metal-oxide semiconductor photocatalyst distinct from the first metal-oxide semiconductor photocatalyst with a second bandgap distinct from the first bandgap;
   wherein the first bandgap makes the first metal-oxide semiconductor photocatalyst reactive to visible incident light,
   wherein the second bandgap makes the second metal-oxide semiconductor photocatalyst reactive to near-infrared incident light, and
   wherein the first and second metal-oxide semiconductor photocatalysts are chosen so that a reactant reduction rate of the photocatalytic compound is at least 20% greater than a sum of individual reactant reduction rates of the first and second metal-oxide semiconductor photocatalysts.

2. The photocatalytic compound of claim 1 wherein the first and second metal-oxide semiconductor photocatalysts comprise particles a majority of which have diameters greater than 0.1 μm.

3. The photocatalytic compound of claim 1:
   wherein the first metal-oxide semiconductor photocatalyst is $Fe_2O_3$;
   wherein the second metal-oxide semiconductor photocatalyst is CuO; and
   wherein a molar ratio of the first and second metal-oxide semiconductor photocatalysts in the photocatalytic compound is approximately 1:1 (approximately 2:1 by weight).

4. The photocatalytic compound of claim 1 further comprising:
   a third metal-oxide semiconductor photocatalyst distinct from the first and second metal-oxide semiconductor photocatalysts with a third bandgap distinct from the first and second bandgaps;
   wherein the third bandgap makes the third metal-oxide semiconductor photocatalyst reactive to ultraviolet incident light, and
   wherein the first, second, and third metal-oxide semiconductor photocatalysts are chosen so that a reactant reduction rate of the photocatalytic compound is at least 20% greater than a sum of individual reactant reduction rates of the first, second, and third metal-oxide semiconductor photocatalysts.

5. A method of purifying a contaminated item comprising exposing the contaminated item to broad-spectrum light in the presence of the photocatalytic compound of claim 1.

* * * * *